United States Patent
Ginzburg et al.

(10) Patent No.: US 8,401,842 B1
(45) Date of Patent: Mar. 19, 2013

(54) PHRASE MATCHING FOR DOCUMENT CLASSIFICATION

(75) Inventors: Ilan Ginzburg, Saint Pancrasse (FR); Bruno Roustant, Gieres (FR)

(73) Assignee: EMC Corporation, Hopkinton, MA (US)

(*) Notice: Subject to any disclaimer, the term of this patent is extended or adjusted under 35 U.S.C. 154(b) by 1408 days.

(21) Appl. No.: 12/075,339

(22) Filed: Mar. 11, 2008

(51) Int. Cl.
 *G06F 17/21* (2006.01)
(52) U.S. Cl. .......................................................... 704/10
(58) Field of Classification Search .................. 704/1, 4, 704/10
 See application file for complete search history.

(56) References Cited

U.S. PATENT DOCUMENTS

| | | | |
|---|---|---|---|
| 2001/0000356 A1* | 4/2001 | Woods ............................... | 707/3 |
| 2005/0071365 A1* | 3/2005 | Hou et al. ....................... | 707/102 |
| 2005/0086205 A1* | 4/2005 | Franciosa et al. ................. | 707/3 |
| 2006/0253410 A1* | 11/2006 | Nayak et al. ...................... | 707/1 |

\* cited by examiner

*Primary Examiner* — Angela A Armstrong
(74) *Attorney, Agent, or Firm* — Barry N. Young

(57) ABSTRACT

Phrase matching processes for matching phrases comprising a plurality of keywords in document text construct hit lists of the keywords in a document text, and operate on the keywords in either phrase order or without regard to the order of occurrence of the keywords in the phrase. The processes form sorted sets of all keywords, and compare occurrences of the keywords in the sorted sets to a predefined proximity constraint. For unordered phrases, the proximity constraint defines a maximum span between keywords in the highest and lowest positions in the sorted set as MaxSpan=p(k−1), where p is a proximity and k is the number of keywords in the phrase. For ordered phrases, the distances between successive phrase keywords in phrase order must be less than or equal to the proximity p.

19 Claims, 10 Drawing Sheets

---

Phrase: "A B C"

Proximity Constraint = 1
Max Span = 1 x (3 − 1) = 2

Text: "A B x C A B A"

Position: 1 2 3 4 5 6 7

Sorted Sets:

1     A B x C A B C     SortedSet={(A,1), (B,2), (C,4)}
                                           Max Span = 4 − 1 = 3

2     A B x C A B C     SortedSet={(B,2), (C,4), (A,5)}
                                           Max Span = 5 − 2 = 3

3     A B x C A B C     SortedSet={(C,4), (A,5), (B,6)}
                                           Max Span = 6 − 4 = 2

| CATEGORY | PHRASE |
|---|---|
| SALSA: | ["SALSA" "DANCE"] |
| SHAKESPEARE: | ["TO" "BE" "OR" "NOT" "TO" "BE"] |
| • | • |
| • | • |
| • | • |

DOCUMENT TEXT:

"There are plenty of salsa recipes, some need to be kept some to be skipped"
Word Position:    0  1  2  3  4  5  6  7  8 9  10  11 12 13  14

HitList[salsa] = 4
HitList[dance] = [ ]
HitList[to] = [8, 12]
HitList[be] = [9, 13]
HitList[or] = [ ]
HitList[not] = [ ]

FIG. 4

Phrase: "A B C"    Proximity Constraint = 1
Max Span = 1 x (3 - 1) = 2

Text: "A B x C A B A"

Position: 1 2 3 4 5 6 7

Sorted Sets:

1    A B x C A B C    SortedSet={(A,1), (B,2), (C,4)}
Max Span = 4 − 1 = 3

2    A B x C A B C    SortedSet={(B,2), (C,4), (A,5)}
Max Span = 5 − 2 = 3

3    A B x C A B C    SortedSet={(C,4), (A,5), (B,6)}
Max Span = 6 − 4 = 2

FIG. 7

Phrase: "A B C"     Proximity Constraint = 2    (ORDERED)

Text:    A A B B x C A

Pos:    1 2 3 4 5 6 7

| Steps: | | Phrase Word Occurrences |
|---|---|---|
| 1 | A A B B x C A | $1^{st}$ Phrase Word – $1^{st}$ Occurrence = (A,1) |
| 2 | A A B B x C A | $2^{nd}$ Phrase Word – $1^{st}$ Occurrence = (B,3) |
| | | Proximity: (B,3) – (A,1) = 2  [Match] |
| 3 | A A B B x C A | $3^{rd}$ Phrase Word – $1^{st}$ Occurrence = (C,6) |
| | | Proximity: (B,3) – (C,6) = 3  [No Match] |
| 4 | A A B B x C A | $2^{nd}$ Phrase Word – $2^{nd}$ Occurrence = (B,4) |
| | | Proximity: (B,4) – (A,1) = 3  [No Match] |
| 5 | A A B B x C A | $1^{st}$ Phrase Word – $2^{nd}$ Occurrence = (A,2) |
| | | Proximity: (B,4) - (A,2) = 2 [Match]<br>Proximity: (C,6) - (B,4) = 2 [Match] |
| 6 | A A B B x C A | $1^{st}$ Phrase word – Next Occurrence = (A,7) |
| | | No Additional Phrase Words – End |

FIG. 9

PHRASE MATCHING FOR DOCUMENT CLASSIFICATION

BACKGROUND

This application relates generally to text matching in classification systems and methods, and more particularly to automated systems and methods for locating and matching keywords, phrases and expression patterns in textual content.

The explosion of unstructured digital content, e.g., text, has created significant problems for large enterprises, such as business organizations, in organizing, storing and accessing content. It is estimated that over 80% of the content in a global organization is unstructured and does not fit neatly into relational databases. Much of this content is central to the organization's processes and value chain. Knowledge workers needing quick, seamless access to this information face a daunting task. It is estimated that employees spend a significant portion of unproductive time just looking for information they need to do their job, and much institutional knowledge can be lost by simply being inaccessible when needed. As a result, much content is recreated or re-acquired, at great expense to the organization, rather than being reused.

To address this problem, enterprises are attempting to organize and classify content assets into logical folder structures that characterize the enterprise's organization, relationships, markets, etc., and which render the content amenable to automated search and retrieval techniques. The folder structures represent categories and sub-categories that define the enterprise's content taxonomy. Creating an effective taxonomy and classifying content according to the taxonomy are difficult and time-consuming endeavors. Many enterprises already have large repositories of unorganized content which would be very difficult and costly to categorize manually. Moreover, new content is continually being created or acquired, and must also be analyzed and appropriately classified, which is equally difficult and costly. It is desirable that this be done automatically, and various approaches have been developed for automatically tagging and categorizing unorganized content.

Some known automated text-based classification approaches suffer from a number of disadvantages that have limited their utility. Generally, their classification accuracy, consistency, efficiency and flexibility to handle complex content and taxonomies may be limited. Some automated approaches are also slow. Some do not operate on phrases, but rather on "minimal intervals", and these do not deal correctly with multiple occurrences of the same words in a phrase. (An example of such a process is the so-called "plane-sweep" process described in Sadakane, K., et. al., *Text Retrieval Using k-Word Proximity Search*, Dept. of Information Science, University of Tokyo, 1999.) This can cause incorrect matches, produce inaccurate classifications, and is particularly detrimental when classifying textual content such as documents in technologies such as chemistry pharmacology, medicine or biology, for instance, where technical terms often repeat.

It is desirable to provide automated phrase matching processes and systems that are capable of quickly and accurately locating and matching keywords, phrases and patterns in large document sets and other similar textual content according to predetermined rules to facilitate classification of documents in accordance with a taxonomy, and that avoid the foregoing and other problems of known phrase matching approaches. It is to these ends that the present invention is directed.

BRIEF DESCRIPTION OF THE DRAWINGS

FIG. 4 illustrates an example of the process of FIG. 3 for generating phrase keyword hit lists;

FIG. 7 illustrates an example of the process of FIG. 6;

FIG. 9 illustrates an example of the process of FIGS. 8A-B.

DESCRIPTION OF PREFERRED EMBODIMENTS

The invention is particularly well adapted for automatically locating and determining matches of keywords, phrases and expressions in unstructured textual content such as documents and the like to facilitate automatic content classification and tagging, and will be described in that context. However, as will be appreciated, this is illustrative of only one utility of the invention. For instance, the invention will be described in the context of matching textual content that comprises words and phrases that are constituents of natural language, since this is a principal area of applicability of the invention. It will become apparent, however, that the invention is applicable more generally to matching other types of non-textual content comprising strings and patterns of other types of characters and symbols, both alphabetic and non-alphabetic, that are neither textual nor language-based in character. Accordingly, as used herein the terms "word" and "keyword" mean generally a string of alphabetic, non-alphabetic or numeric symbols or characters, and the term "phrase" means a set of such strings of such symbols and characters.

Figure 1:
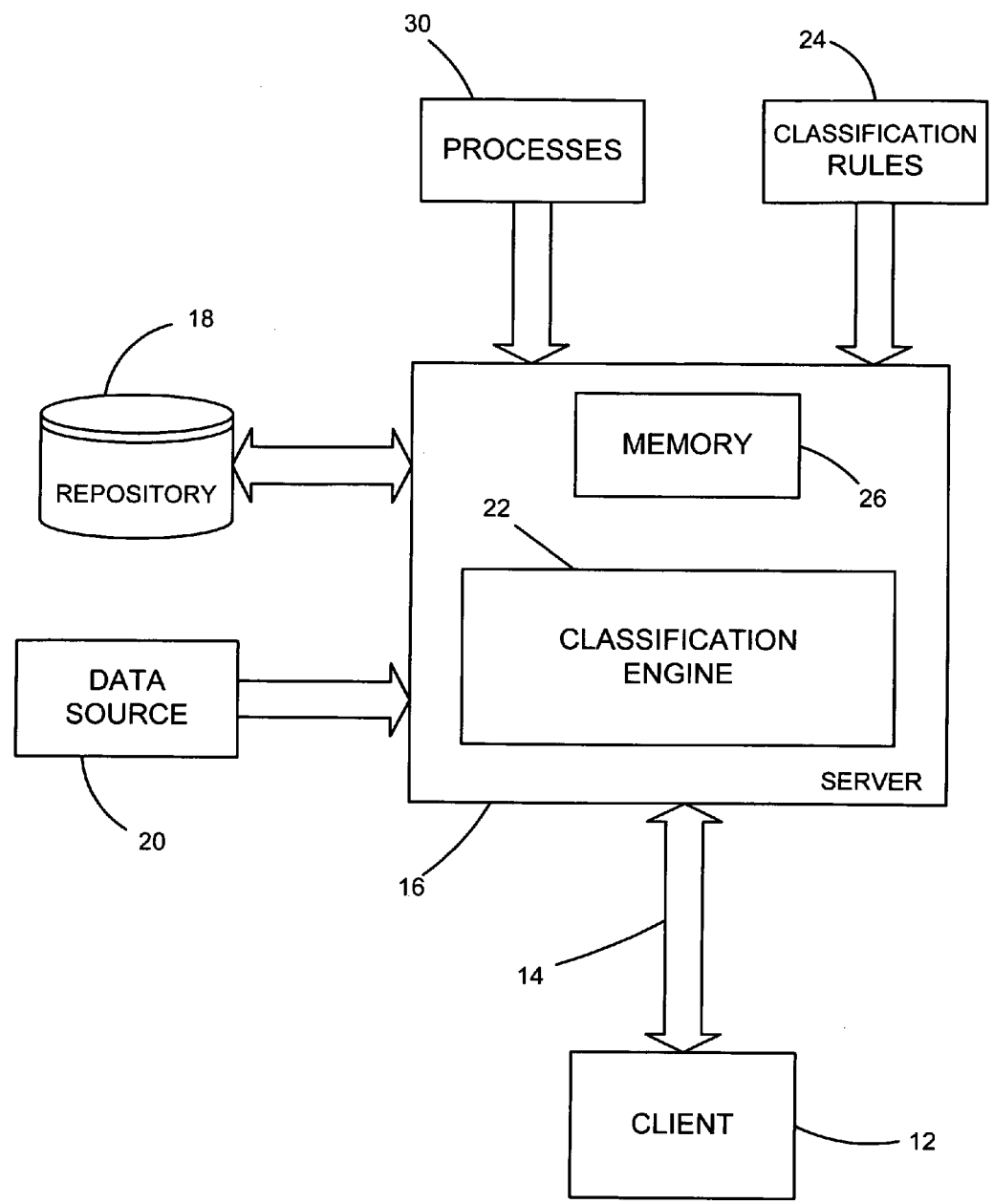
FIG. 1 is a diagrammatic view of a system of the type with which the invention may be employed.

FIG. 1 is a diagrammatic view that illustrates an automatic content classification and tagging system of the type with which the invention may be employed. As will be described in more detail below, the invention affords systems and methods for automatically matching keywords and phrases in textual content with predefined rules which specify characterizing keywords and phrases to facilitate automatic classification and tagging of the textual content, such as documents and the like. FIG. 1 is an example of the architecture of one system for automatic classification of content, and is presented in order to provide better context for the invention. It will be appreciated, however, that this architecture is merely representative of some of the functional aspects of automatic content classification systems more generally, and that such systems may have different forms and different architectures.

As shown in FIG. 1, the content classification system may be a client-server computer system in which a client 12 is connected via a network 14 to a server 16. Network 14 may be a local area network, a wide area network, or the Internet, for example. In one embodiment, server 16 may be a server of a business enterprise or other organization which is connected to a content repository 18 and to a data source 20. Data source 20 may comprise an input source of content to the server that is generated within the enterprise, or it may comprise content which is acquired from outside of the enterprise. Server 16 may include a classification engine 22 which processes content from either the repository or from data source 20 in accordance with predefined classification rules 24 to classify the content in predefined taxonomy categories of the enterprise. Server 16 may comprise a computer system, for example, and classification engine 22 may comprise a processor within the computer system. Server 16 may also include a memory 26, and may receive as input processes 30 comprising computer programs and algorithms for controlling the classification engine in order to locate and match keywords, phrases and expressions in the input content, so that the classification engine can apply the classification rules 24 to appropriately classify the content. Once classified, the content may be appropriately tagged, as with metadata, and stored in appropriate folders in repository 18 that represent the various categories of the taxonomy. Processes 30 may be stored on computer readable media or input to server 16 from another source, and may comprise computer programs for controlling the operation of the server and/or classification engine.

As may be appreciated, the system illustrated in FIG. 1 may have multiple repositories 18 and multiple sets of classification rules 24. The rules may enable classifying and tagging textual content such as documents in accordance with multiple different classification rules and categories, and even in accordance with different taxonomies. The classification rules 24 may similarly be stored on computer readable media and comprise computer programs and processes that control operation of the classification engine for classifying the content using the results of the keyword and phrase matching processes 30. As will also be appreciated, the system of FIG. 1 may operate to classify not only new incoming content 20, but also to classify previously acquired unclassified content stored in repository 18, and may operate in real time to classify content as it is being created in the enterprise.

Figure 2:
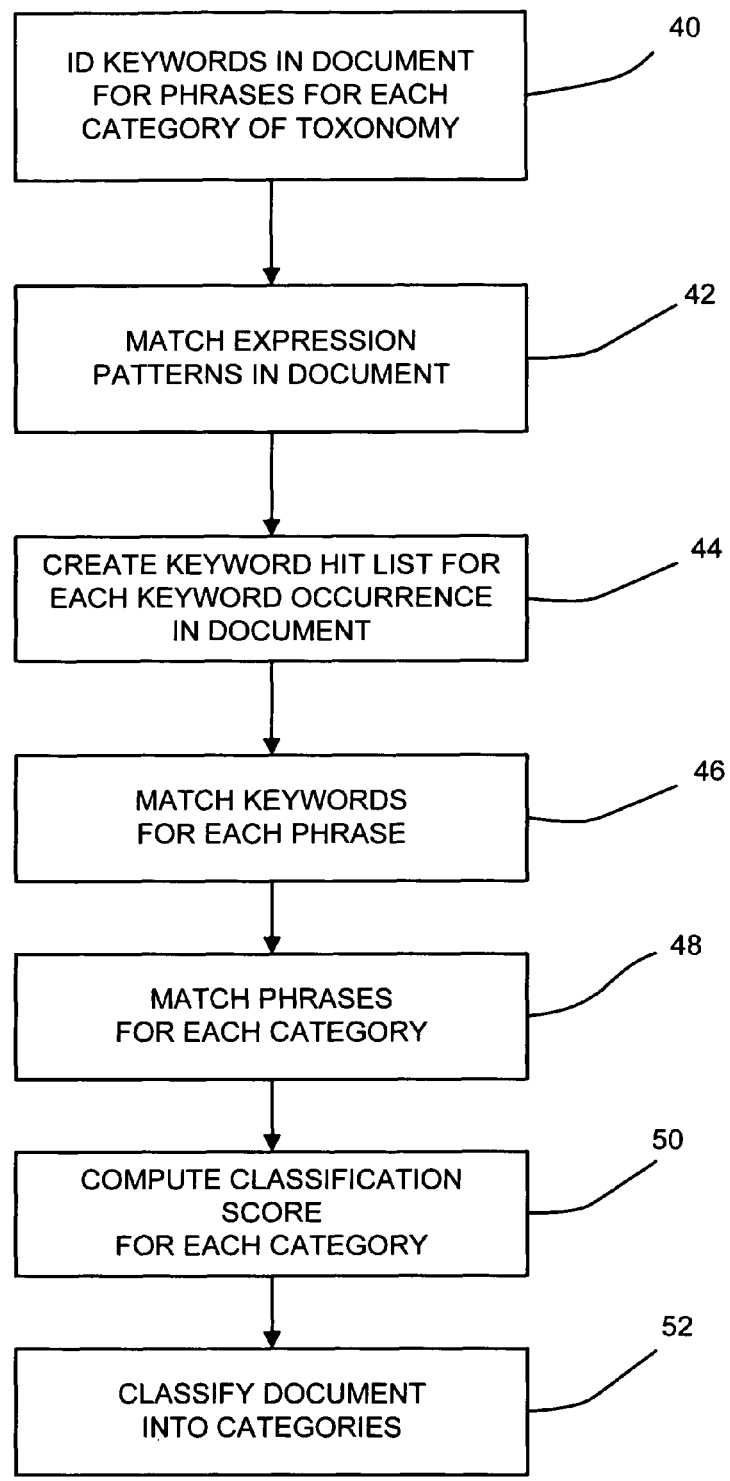
FIG. 2 is a flowchart giving an overview of a process for classifying documents into categories of a taxonomy based upon matching of keywords, phrases and patterns (or regular expression)

FIG. 2 is a flowchart which illustrates an overview of an example of a classification process as may be performed by the classification engine 22. Generally, classification of unstructured content such as text documents involves classifying the documents into categories in a predefined taxonomy. This can be done in several different ways. Generally, each category of the taxonomy may be defined by one or more rules that look for one or more of keywords, phrases comprising sets of keywords, and/or regular expression patterns in a document. If the keywords, phrases, and patterns that are specified by a rule of the taxonomy are matched in a document, the document may be classified into the corresponding category. As may be appreciated, a taxonomy may also comprise a hierarchical structure of categories, in which a particular higher level or parent category may be further broken down into sub-categories. This enables content meeting the criteria for classification within the particular higher level category to be further classified into sub-categories to more precisely and accurately classify it.

Referring to FIG. 2, a typical classification process may include a number of steps that involve ultimately matching keywords, phrases and patterns of expressions in textual content, such as a document. Initially, the classification process may identify, as indicated at 40, keywords in a document for one or more phrases in each of the categories of the taxonomy. This comprises first "tokenizing" phrases appearing in the category definitions of the taxonomy, where tokenizing involves transforming characters into words and words into phrases. This may be done by tokenizing the document text by transforming the sequence of characters in the text into words, and then matching the document words to the keywords defined by the category definitions. At 42 regular expression patterns of the categories that occur in the document text may be matched. At 44, keyword hit lists may be created for each occurrence of a keyword in a document, as will be described in more detail in connection with FIG. 3. Next, at 46, the keywords of each category in a document may be matched, and at 48 the phrases that occur in the document text in each of the categories may be matched. At 50, after all of the matches have been found for a document, a classification score for each category may be computed. This score may comprise, for example, simply the number of occurrences of keywords, phrases or expression patterns in each category. Finally, at 52, a document may be classified into one or more categories (or sub-categories) depending upon its classification scores.

It is desirable that classification systems and processes be fast and operate on content quickly and predictably with classification rules that can be established by system administrators as required. The invention facilitates this by enabling keywords and phrases (sets of keywords) to be matched efficiently and successively in documents. The invention preferably first tokenizes all words in a document's text. Then it may search for words defined in both the keywords and phrases of the categories, and include each occurrence of a keyword in a corresponding hit list that maintains the indices (positions) of each occurrence of each keyword in the text. This facilitates finding a keyword in a document's text by simply consulting the hit list for that keyword. The manner in which keyword hit lists are created will be described in more detail shortly in connection with FIG. 3.

The process 46 for matching phrases for each category is a more complex process than simply matching keywords. A phrase comprises a string of keywords that constitute the phrase. Matching of phrases to document text may involve taking into account the occurrences of phrase keywords in the text, their order of occurrence, and the proximity of the occurrences between phrase keywords. As will be described, the invention provides two different processes or algorithms for identifying and matching phrases in the text of the document. These may both be used for classifying a document. One process finds and operates on phrases having keywords appearing in the content in their order of occurrence in the phrase ("ordered phrases"), and the other process finds phrases in which the keywords may occur in any order in the content ("unordered phrases"). Both processes take into account the proximity of occurrences of phrase keywords, although in different ways as will be explained. One or both of the processes may be employed at the option of the taxonomy/category administrator when he defines a new rule with the phrase. If the rule defines an ordered phrase, keywords are identified and matched when they occur in correct phrase order. If the rule defines an unordered phrase, the process looks for phrase keywords that appear without regard to their order in the phrase. Each process and its advantages are described in more detail below.

As indicated above, each category of the classification rules may define one or more phrases to match in the text of the document. If a phrase is matched correctly in the document text, then the corresponding category may be assigned to the document. It is desirable, but not necessary, that that the phrase matching processes of the invention match all occurrences of a phrase, and all phrases defined by a category rule, that occur in a document for each category of the taxonomy. The phrase matching processes of the invention are capable of doing this very efficiently and quickly.

As indicated in connection with FIG. 2, before any word or phrase matching occurs, the invention first identifies keywords in a document text, and preferably tokenizes the words. Only words in the document text that are also keywords of the taxonomy rules are relevant. Each occurrence of a keyword in the document may be stored in a corresponding keyword hit list. A keyword hit list ("HitList[kw]") is a data structure comprising the word position of each occurrence ("hit") of the keyword "kw" in the document text. It corresponds to the well-known "word level inverted index" widely used in document retrieval systems and text mining.

Figure 3:
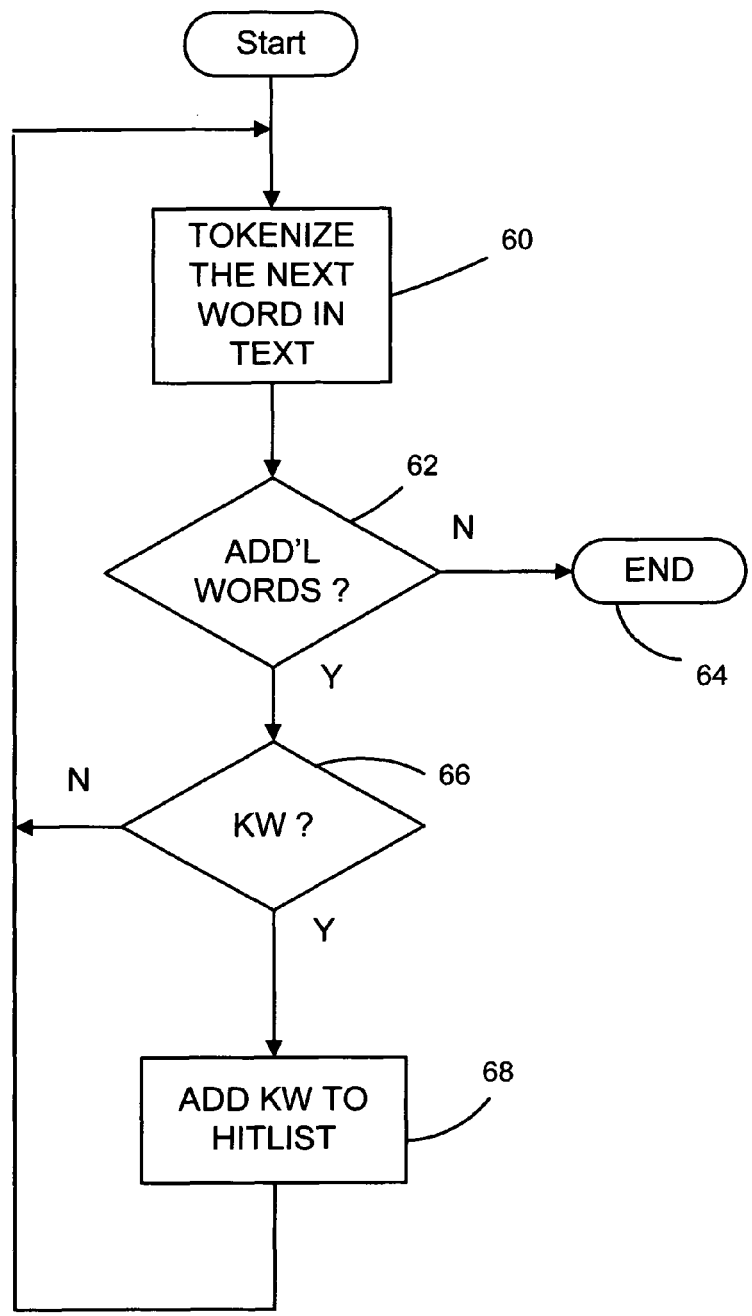
FIG. 3 is a flowchart illustrating a process in accordance with the invention for generating phrase keyword hit lists.

FIG. 3 is a flowchart which illustrates an embodiment of a process for generating keyword hit lists. To construct the hit lists, the content is scanned once. During this scan, all keywords are simultaneously searched, and keyword hit lists are built using the process shown in FIG. 3. As shown in the figure, the process begins at 60 by tokenizing a word in the text of the document being processed. At 62, the process determines whether there are additional words. If not, the process ends at 64. If there are additional words, at 66 the process determines whether the word is a keyword. If the word is not a keyword, the process braches at 66 back to step 60 where it tokenizes the next word in the text and repeats by going to step 62. If instead at 66 the word is a keyword, at 68 the process adds the position (index) in the text of the keyword to the corresponding keyword hit list. The process then loops back to step 60 and repeats searching the document for any additional occurrences of a keyword until there are no additional words, at which point the process ends. Each additional keyword occurrence is added to the corresponding keyword hit list at 68.

The result of the process of FIG. 3 is a set of hit lists for each keyword of a phrase specified in a taxonomy rule. Since the document needs to be scanned only once to construct the keyword hit lists, the process of FIG. 3 is very efficient and fast, particularly for large documents. These hit lists may be used for forming sorted sets of keywords, as will be described in connection with FIG. 5, and the sorted sets used by the phrase matching processes of the invention as described below.

FIG. 4 is an example that illustrates the construction of keyword hit lists for keywords that appear in document text for phrases defined by two taxonomy categories, salsa and Shakespeare. For purposes of illustration, it is assumed as shown in FIG. 4 that the taxonomy rules classify a document into the salsa category if the phrase ["salsa" "dance"] containing the keywords "salsa" and "dance" is found in the document text, and that the taxonomy rules classify a document into the Shakespeare category if the phrase ["to" "be" "or" "not" "to" "be"] is found in the document. Assume the document text is:

"There are plenty of salsa recipes, some need to be kept, some to be skipped." Hit lists have the form "HitList[keyword]=[WordPosition1, WordPosition2, . . . ] where "WordPosition" is a word position or index in the content where the "keyword" appears. Hit lists of keywords for this text, as shown in FIG. 4, are:

HitList[sa/sa]=[4]
HitList[dance]=[ ]
HitList[to]=[8, 12]
HitList[be]=[9, 13]
HitList[or]=[ ]
HitList[not]=[ ]

The keyword "salsa" occurs in the text at position 4, but the keyword "dance" does not occur. Thus, the HitList[dance] is empty. There is, accordingly, no match for the phrase ["salsa" "dance"] in the document text. Accordingly, the document fails to satisfy the classification rule, and it would not be classified in the category Salsa. Similarly, the keyword "to" occurs at positions 8 and 12, and the keyword "be" occurs at positions 9 and 13, but the other keywords of the phrase ["to" "be" "or" "not" "to" "be"] do not. Thus, the document would also not be classified in the category Shakespeare. For classification purposes, only phrase keywords are relevant.

In addition to identifying the occurrences of keywords of phrases in document text, the phrase matching processes of the invention also determine whether the phrase words satisfy a predetermined proximity constraint. For an ordered phrase, the proximity constraint refers to the maximum distance allowed between two consecutive phrase keywords for all words in an ordered list of words that constitute the phrase. Thus, for a proximity $p=1$, the phrase keywords must occur in the text exactly in the correct order without any intervening words. Similarly, a proximity $p=3$ means that the precise order of phrase keywords must appear, but there can be two or fewer intervening words between each two consecutive phrase keywords. For unordered phrases, the proximity constraint refers to the maximum span ("MaxSpan") or distance between all phrase keywords, as defined by the relationship $MaxSpan=p(k-1)$, where p is the proximity and k is the number of phrase keywords. To determine whether a phrase match occurs for a particular document text, the phrase defined by the taxonomy rules must occur, and the proximity constraint must be satisfied. This is illustrated by the following examples, where the uppercase letters A, B and C represent three different single phrase keywords, and the lowercase x represents any single word that is neither A, B or C.

For the phrase: A B, ordered, proximity $p=1$
  A B matches
  B A does not match
  A x B does not match
For the phrase: A B C, ordered, proximity $p=2$
  A B C matches
  A C B does not match
  A x B x C matches
  A x x B x C does not match
For the phrase: ABC, unordered, proximity $p=3$, MaxSpan=3 (3-1)=6
  A x x C x x B matches
  A x x C x x x B does not match
  B A x x x x C matches
  B A x x x x x C does not match For ordered phrases, phrase keywords must occur in the correct phrase order, and the proximity between each of the keywords must be satisfied. For unordered phrases, all phrase keywords must occur, although not necessarily in phrase order, and the maximum span must be satisfied. The accuracy of a match between a taxonomy phrase and a document may be controlled by setting the proximity constraint and defining whether the phrase match must be ordered or unordered. This is done when defining a new rule with a phrase. If the rule is defined with an ordered phrase, the process looks for phrase keywords that are ordered. If the rule defines the phrase as an unordered phrase, then the phrase keywords do not have to occur in any particular order.

For instance, assuming that it is desired to define a new category "Mexican recipes". A category rule may be defined as an ordered phrase "salsa recipe" with a proximity of 1. This means that in order to classify a document in this category, it must contain the two phrase keywords "salsa" and "recipe" consecutively and in phrase order. If the document contains only the text "my recipe for salsa", in order to assign this document to the "Mexican recipes" category, it would be necessary to define the rule as being an unordered phrase with proximity of 2.

For a given taxonomy and a given proximity constraint, a document matches the rule if it contains all of the phrase keywords, either ordered or unordered as defined by the rule, and the distance between occurrences of the phrase keywords are less than or equal to the proximity constraint. The phrase matching processes of the invention are fast because the processes preferably look only for phrase occurrences that fulfill the proximity constraint.

Figure 5:
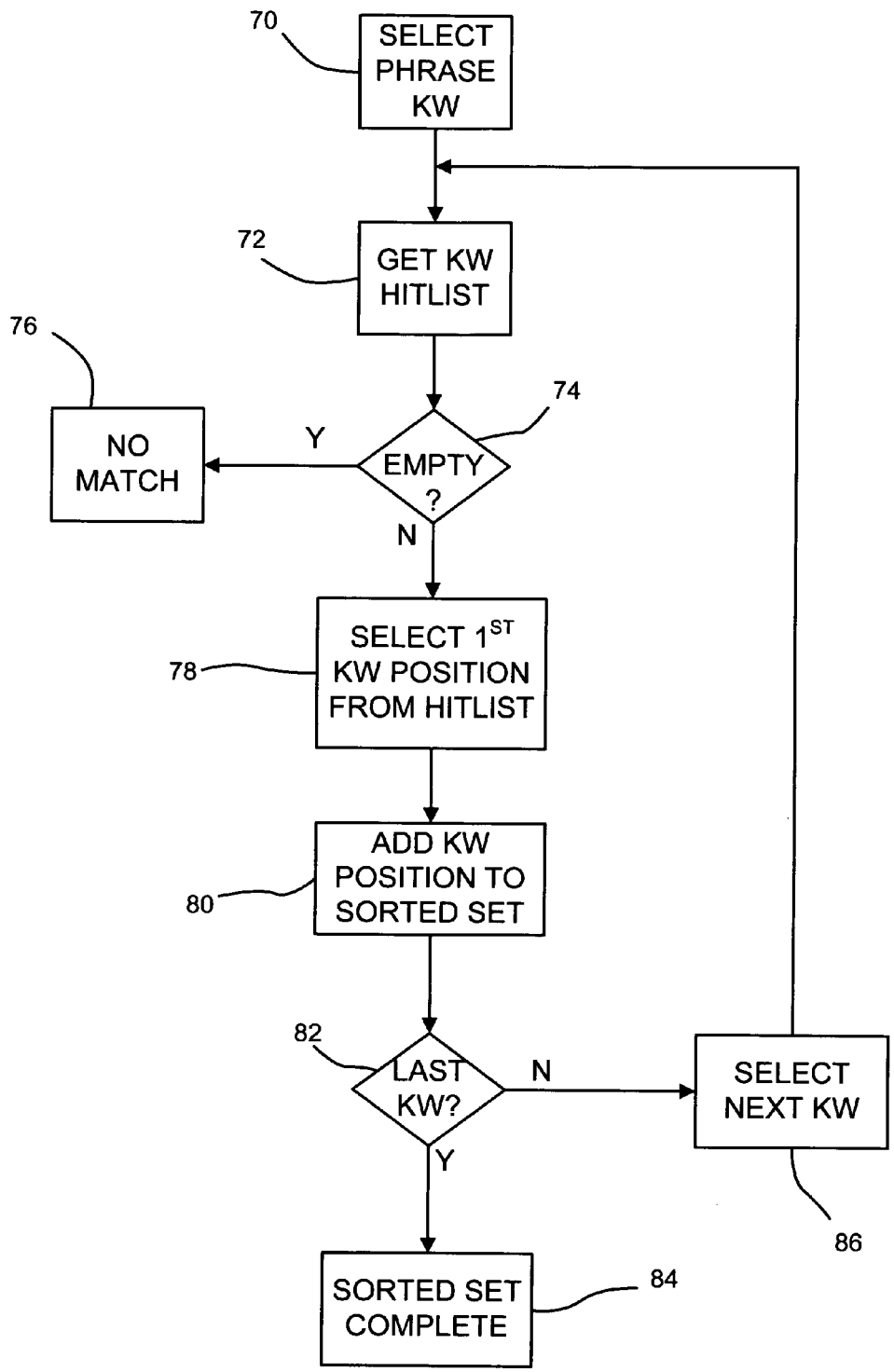
FIG. 5 is a flow chart illustrating a process in accordance with the invention for generating a sorted set of phrase keywords and keyword positions in a document.

For matching unordered phrases, the process of the invention first iterates on each phrase word hit list in order to create a sorted set of phrase keywords and positions, where the set is sorted by keyword positions in the text. A preferred process of creating a sorted set is illustrated in FIG. 5. The process may iterate on each phrase word hit list simultaneously and provide once and only once each hit of a phrase keyword, moving to the next hit after each occurrence. The process of creating a sorted set typically begins at the beginning of the document. The first hit of each phrase keyword is taken from the iterators which operate on the hit lists, and are added to a sorted set of phrase keywords and positions. After forming the first sorted set, the process determines whether the proximity constraint (maximal span) is satisfied. If the maximal span is satisfied, a match is indicated and the sorted set may be cleared and the next hits of all the phrase keywords may be taken from the iterators and added to the next sorted set. If the proximity constraint is not satisfied, then preferably only the phrase word with the lowest position (index) is removed from the sorted set. The next hit of the removed phrase word is then determined and added to the sorted set, and this new sorted set is analyzed to determine whether the maximal span is satisfied. The process continues until the proximity constraint is satisfied or there are no further hits for a phrase word.

FIG. 5 is a flowchart which illustrates a process in accordance with a preferred embodiment of the invention for forming a sorted set. Beginning at 70, the process selects a first phrase keyword, and at 72 obtains the hit list for this keyword. If the hit list is determined at 74 to be empty, there is no match and the process branches to step 76. If the keyword hit list is not empty, the first keyword position may be taken from the hitlist at 78, and the keyword and its position added to the sorted set at 80. This may be done, as described below, by forming an element "(WordPosition.word, WordPosition.position)", where "WordPosition.word corresponds to the phrase keyword, and "WordPosition.position" is the position of the occurrence of the keyword in the document.

If at step 82 it is determined that the keyword was the last phrase keyword, the sorted set is completed at 84 and the process ends. If it was not the last keyword of the phrase, at 86 the next phrase keyword is selected and the process loops back to step 72 and repeats until all phrase keywords have been located. At this point, the sorted set is complete.

Figure 6:
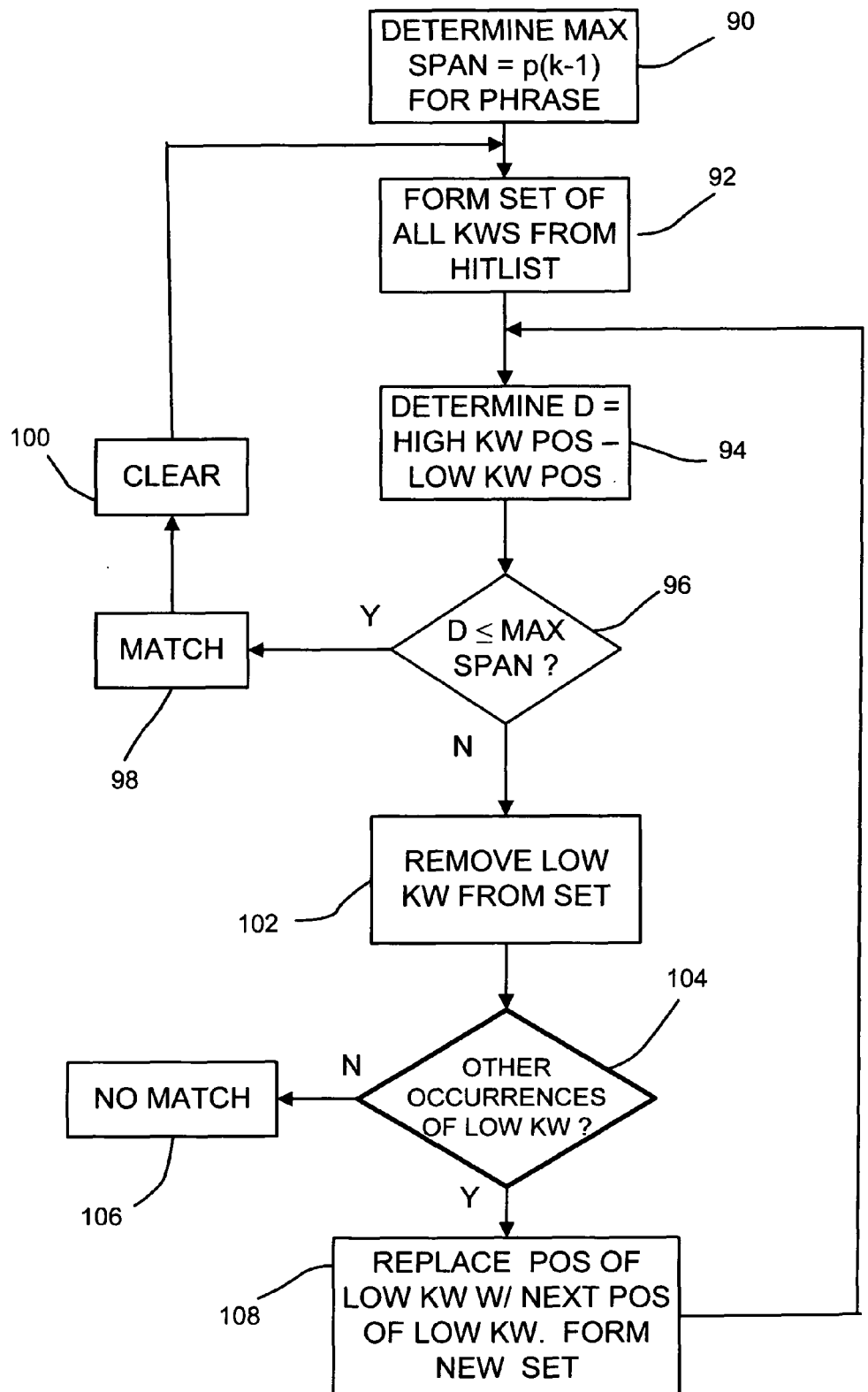
FIG. 6 is a flowchart of a process in accordance with the invention for matching an unordered phrase in a document.

FIG. 6 illustrates the process of matching unordered phrases. The process begins at 90 by first determining the MaxSpan of the phrase. At 92, a first sorted set of all keywords of a phrase may be formed as described in connection with FIG. 5. At 94, the distance between the keywords in the sorted set having the highest position and the lowest position is determined as D=(high KW pos)−(low KW pos). At step 96, the distance D is compared to the MaxSpan. If this D is less than or equal to the MaxSpan, a match may be indicated at 98 and the first sorted set cleared at 100. The process may then return to 92 to form a new sorted set without overlapping any of the keywords of the first or previous sorted set (or any keywords introduced in the new sorted set formed at 108), and repeat steps 94 and 96. If a new sorted set of all keywords cannot be formed at 92, the process ends. If, however, the distance D between the high and low position keywords in the first sorted set is determined at 96 to be greater than the MaxSpan, the keyword having the lowest position may be removed from the sorted set at 102, and at 104 the hit list for the removed keyword may be used to determine whether there are other occurrences of that keyword in the document. If there are no other occurrences of the keyword, then at 106 the process may indicate that there is no match and end. If, however, there are other occurrences of the keyword which was removed at step 102, at step 108 the next position (occurrence) of that keyword is selected and added to the sorted set to form a new sorted set The process then loops back to step 94 and repeats to determine whether the distance between the keywords in the highest and lowest positions in the new sorted set satisfies the maximal span constraint. If so, a match is indicated at 98. If not, the process keeps repeating until a match is found or there are no other occurrences of the keyword which was removed, in which case no match is indicated at 106.

FIG. 7 illustrates an example of the process of FIG. 6. As shown, for the phrase "A B C", where A, B and C represents three phrase keywords, and the proximity constraint is 1, the MaxSpan=1(3−1)=2. Given the text "A B x C A B A", where x represents any word different from A, B or C, the process begins by forming a first sorted set with the first occurrences in the text of keywords A, B and C:

$$ABxCABA\ \text{SortedSet}=\{(A,1),(B,2),(C,4)\}$$

where the bolded words A, B, and C are the first keyword occurrences that form the sorted set comprising elements (WordPosition.word, WordPosition.position).

The proximity constraint (MaxSpan=1×(3−1)=2) is not fulfilled by the word positions in the first sorted set, since the distance between the keyword in the highest position (C,4), i.e., having the highest index, and the keyword in the lowest position (A,1) is 4−1=3, which exceeds the maximal span. Thus, the phrase keyword with the lowest position (A,1) may be removed from the sorted set, and the next occurrence of the phrase keyword A at position 5 may be added to the sorted set as element (A,5) to form a new (second) sorted set:

$$ABxCABA\ \text{SortedSet}=\{(B,2),(C,4),(A,5)\}$$

The proximity constraint (MaxSpan=2) is also not fulfilled by the keyword positions in this second sorted set, since the distance between the lowest keyword position (B,2) and the highest keyword position (A,5) is 5−2=3, which is greater than the MaxSpan. Thus, the process of FIG. 6 is repeated again. The phrase keyword B with the lowest position (B,2) in the second sorted set may be replaced by the next occurrence of the phrase keyword B at position 6, element (B,6), to produce a third sorted set:

$$ABxCABA\ \text{SortedSet}=\{(C,4),(A,5),(B,6)\}$$

The proximity constraint (MaxSpan=2) is now fulfilled by the word positions in this third sorted set, since 6−4=2. So a phrase match is found at word position 4 of the document text.

The third sorted set may then be cleared, and the process repeated to determine whether there are additional matching occurrences of the phrase. Thus, the process uses the hit lists to form a new sorted set with no overlapping words from the previous sorted set, and repeats. The next occurrences of all of the phrase words are selected to produce a next sorted set. However, while the next occurrence of the first phrase word A appears in position 7, there are no other occurrences of phrase keywords for B or C. Thus, the process ends. If there had been no matches for the previous sorted sets, the rule would fail and the document would not classified in the corresponding category. In order for there to be a phrase match, all keywords of a phrase must be present in the content.

The process of FIG. 6 may also be described using the following pseudo code:

```
For each phrase word
    Take the first occurrence of the word from its HitIterator
    Add the occurrence in WordPositionsSet
End for
Loop
    firstWordPosition = the first WordPosition of WordPositionsSet
    lastWordPosition = the last WordPosition of WordPositionsSet
    If lastWordPosition.position - firstWordPosition.position <=
MaxSpan
    We have found a match of the phrase, starting at
firstWordPosition.position
    Clear WordPositionsSet
    For each phrase word
        Take the next occurrence of the word from its HitIterator
        Add the occurrence in WordPositionsSet
        If the word has no more hit
            Stop here, the phrase does not match anymore
        End if
    End for
Else
    Remove firstWordPosition from WordPositionsSet
    Take the next occurrence of the firstWordPosition.word from
its HitIterator
    Add the occurrence in WordPositionsSet
    If firstWordPosition.word has no more hit
        Stop here, the phrase does not match anymore
    End if
End if
End loop
```

The process for matching unordered phrases as shown in FIG. 6 is efficient and quite fast in relation to other known processes for searching for and matching keywords in documents. When there are n positions, i.e., words, in a document, and k phrase keywords, if the positions of the phrase keywords are in sorted order, the process of FIG. 6 runs in the worse case in O(n k log k). In fact, there are a maximum of n loops of the process in which either one phrase keyword is removed from the sorted set (O(log k)) and its next occurrence added to the sorted set, or the sorted set is cleared (O(1)) and the next occurrences of all phrase words are added (O(k log k)). The actual time complexity will be O(m k log k), with m≦n being the number of phrase keywords appearing in the document, which is in practice much lower than the number of words in the document.

The process of FIG. 6 is a novel approach for searching for unordered phrases in text and dealing correctly with multiple occurrences of the same phrase keyword. The process searches for all occurrences of an unordered phrase of k keywords within a maximal span constraint. It begins by selecting the lowest positions of phrase keywords in the text. Moreover, different phrase matches do not share the same occurrence of a keyword. For example, given the phrase "A B C", where A B and C represent three phrase keywords, and a proximity constraint of 2 (MaxSpan=2(3−1)=4, and the text "C A B x A X C", the process matches a phrase occurrence at position 1, i.e., C A B x A x C, but does not produce another phrase occurrence at position 3, i.e., C A B x A x C, since this would reuse the keyword B at position 3, which was a constituent of the previously matched phrase.

Another important feature of the process of FIG. 6 is that it is able to handle multiple occurrences of the same keyword in a phrase being searched. For example, given the phrase "to be or not to be" the keyword "to" appears twice in the phrase (in positions 1 and 5). The process of the invention correctly handles multiple occurrences of a keyword in a phrase because all occurrences of a keyword share the same hit iterator, i.e., share the same hit list. This ensures that each occurrence of a phrase keyword can only be used once in the process. For instance, with the phrase "to be or not to be", and the text "the question is to be or not to be or not to be", the process matches:

The question is to be or not to be or not to be (phrase occurrence at position 4).

That is, the process matches a phrase occurrence at position 4, but does not find a second phrase occurrence at position 8. In other words, the process does not find occurrences of overlapping phrases. This can be important for classification engines that count the number of occurrences of phrases in a document text in order determine whether a category is to be assigned to the document. If the process incorrectly indicates matches of phrases which overlap, a false count will be produced and the document can be improperly classified.

Unlike the process for matching unordered phrases which looks to the maximal span of the highest and lowest keywords in a sorted set, the process for matching ordered phrases looks to determine whether the proximity constraint is satisfied between each pair of consecutive phrase words in an ordered list of keywords that constitute the phrase. Beginning with the first occurrence of the first phrase keyword from its hitlist, the distance between the first phrase keyword and the position of the next keyword is compared to the proximity constraint. If the distance is less than or equal to the proximity, the first keyword of the phrase is taken to be valid and the second keyword is compared with the third keyword to determine whether the proximity is satisfied. If, however, the distance between the first and second phrase keywords does not satisfy the proximity, the process preferably backtracks in the text to find the next occurrence of the first phrase keyword that fulfils the proximity constraint with the second keyword. This backtracking may be repeated until the proximity constraint is satisfied. If the constraint cannot be satisfied because there are no further occurrences of phrase keywords, the process ends and there is no match. A match is found if all phrase words have been matched and the proximity constraint is fulfilled.

Figure 8A:
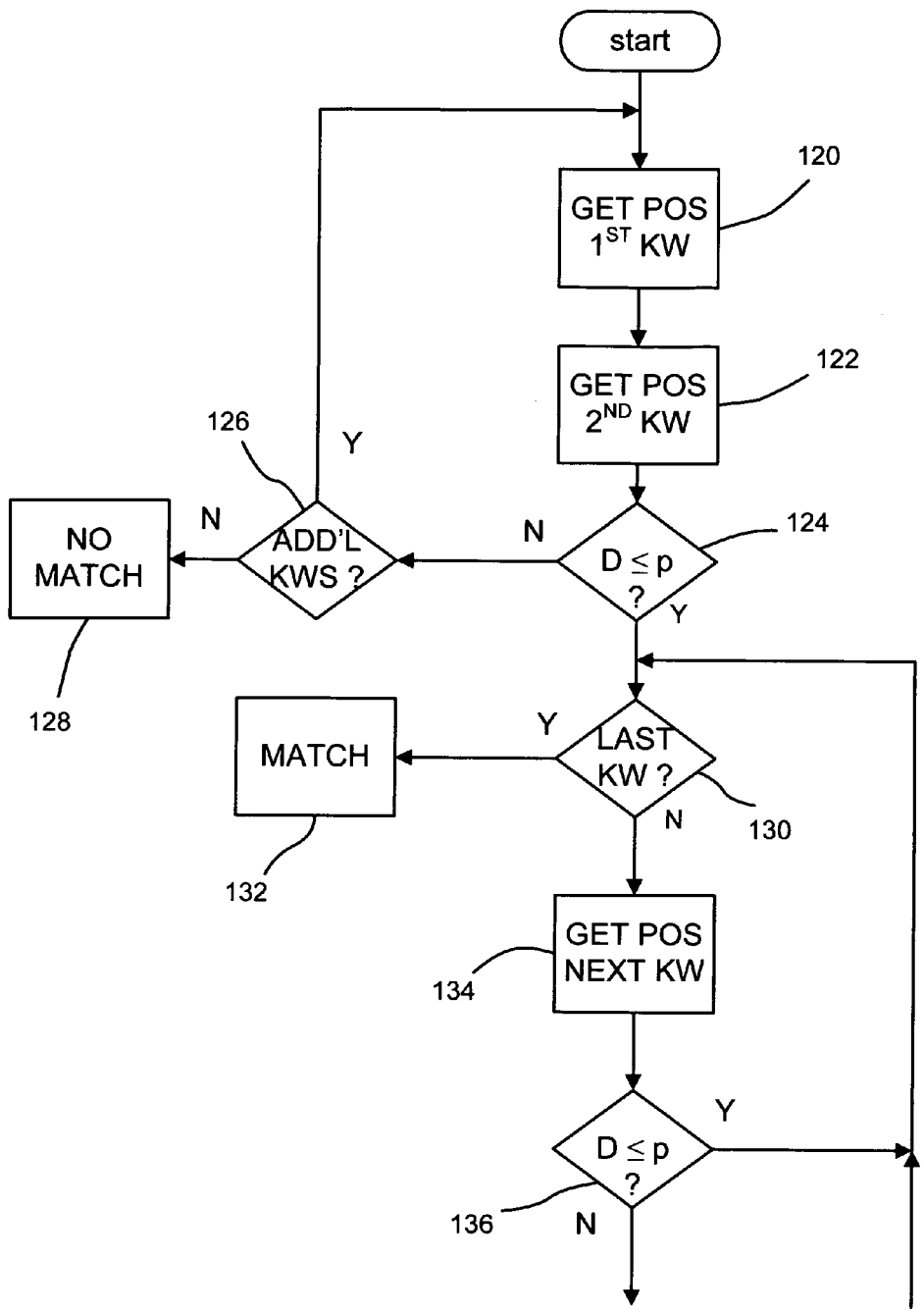
FIGS. 8A-B are a flowchart of a process in accordance with the invention for matching an ordered phrase in a document.
Figure 8B:
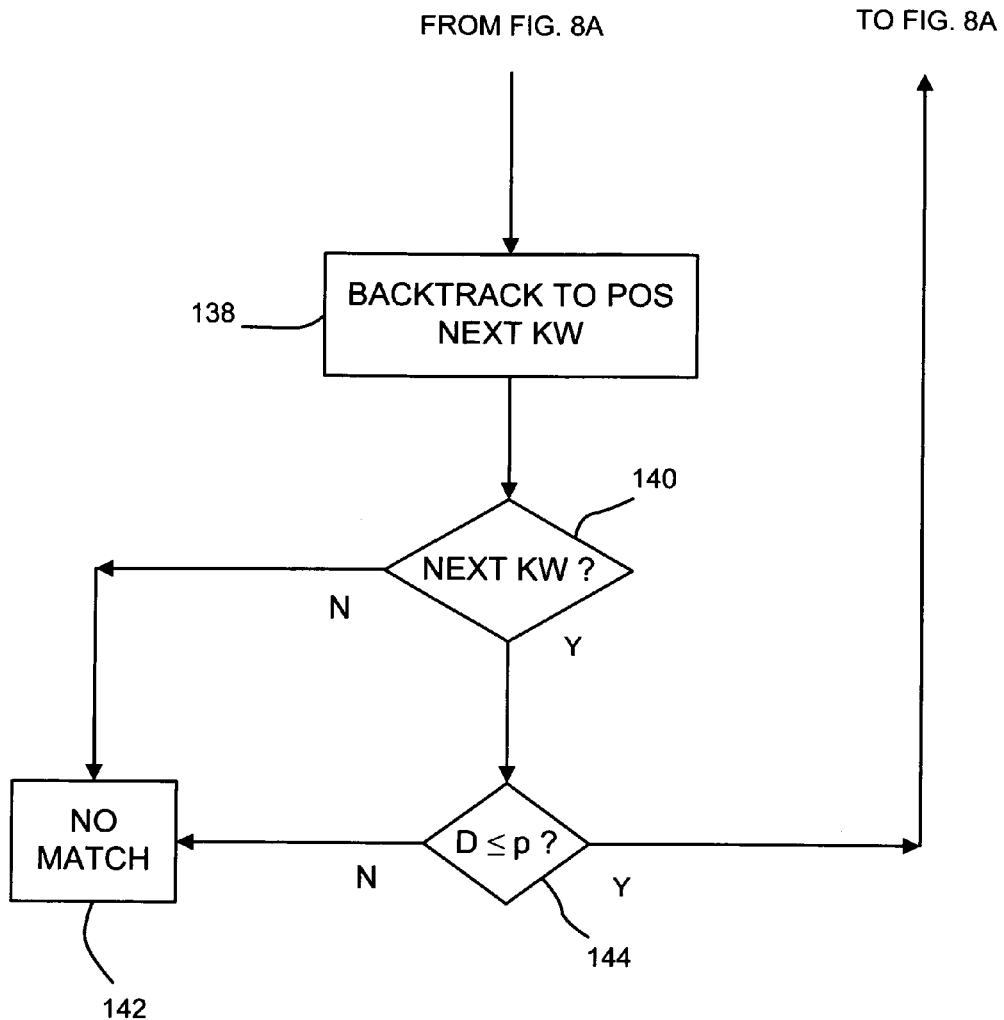

FIGS. 8A-B are a flowchart which illustrates a preferred embodiment of an ordered phrase matching process in accordance with the invention. At steps 120 and 122, the first occurrences of the first and second phrase keywords may be located in a document, and the distance between the first and second keywords compared to the proximity constraint at 124. If the distance does not satisfy the proximity, at 126 it is determined whether there are additional occurrences of the first keyword in the document. If so, the process may loop back to step 120 and repeat. If, upon repeating, it is determined at 120 that the additional (i.e., new) occurrence of the first keyword still precedes the first occurrence of the second keyword as originally determined previously at step 122, i.e., the first and second keywords still occur in order, that new occurrence of the first keyword is used at step 120 and the original occurrence of the second key word is reused at step 122, and the distance between the two keywords is determined at 124. Otherwise, if the new occurrence of the first keyword does not precede the first occurrence of the second keyword as originally determined at 122, the next occurrence of the second keyword (if any) that follows the new occurrence of the first keyword is used at step 122, i.e., so that the first and second keywords are in order. If at 126 there are no additional keywords in the document, at 128 no match is indicated.

If at 124 the distance between the keywords does satisfy the proximity, the process moves to step 130 at which it is determined whether there are additional phrase keywords. If there are not, at 132 a match is indicated. If, however, at step 130, there are additional phrase keywords, the position of the next phrase keyword may be determined at step 134 and the distance between this keyword and the previous keyword compared to the proximity constraint at 136. If the proximity constraint is satisfied, the process may loop back to 130 to determine whether there are additional phrase keywords and continue until the last phrase keyword has been tested.

If, however, at step 136, the distance between the current phrase keyword and the previous phrase keyword does not satisfy the proximity constraint, then at step 138 the process backtracks to the previous keyword to find its next occurrence. If it is determined at step 140 that there are no additional occurrences of the previous keyword, no match is indicated at step 142. Otherwise, at step 144 the distance between the current and the previous keywords may be compared to the proximity constraint to determine if the proximity constraint is satisfied. If the proximity constraint is satisfied at step 144, the process may return to step 130 and continue repeating until all phrase keywords have been tested. If, instead, at step 144 the proximity constraint is not satisfied, no match is indicated at step 142.

FIG. 9 illustrates an example of the process of FIGS. 8A-B in matching an ordered phrase. Assume the phrase is "A B C", where A, B and C represent three phrase keywords, the proximity constraint is 2, and the text is "A A B B x C A", where x represents any word different from A, B or C. The process may begin by locating the first occurrence of the first phrase keyword A at position 1, producing the element (WordPosition.word,WordPosition.position)=(*A*,1)

Since this is the first phrase keyword, its occurrence is unconditionally taken, i.e., AABBxCA where the first occurrence of the first phrase keyword, A, is indicated in bold.

Next, the first occurrence of the next ordered phrase keyword B is taken at position 3, (B,3). Since the first occurrence of B is within two words of A (at position 1), this fulfils the proximity constraint because (B,3)−(A,1)=2, i.e., AABBxCA The first occurrence of the next ordered phrase keyword C at position 6, (C,6) is then taken, i.e.

AABBxCA

However, the first occurrence of C at position 6 is not within two words of B at position 3 ((C,6)−(B,3)=3), so C at position 6 does not fulfil the proximity constraint with B at position 3. Therefore, the process backtracks to the previous phrase keyword, B, and gets the next occurrence of B at position 4, (B,4). Although, the proximity (C,6)−(B,4)=2 between B and C is now satisfied, at position 4 phrase keyword B is too far from its previous ordered phrase keyword A at position 1 to satisfy the proximity constraint, i.e., AABBxCA Therefore, the algorithm backtracks to B's previous ordered phrase keyword A and gets unconditionally its next occurrence at position 2, (A,2). As it is the first phrase keyword, there is no proximity to check, producing AABBxCA The process then returns to the phrase keyword B at position 4, (B,4). Now, keyword B at position 4 fulfils the proximity constraint with its previous ordered phrase keyword A at position 2 since (B,4)−(A,2)=2, i.e., AABBxCA The algorithm then returns to the next phrase keyword C at position 6 which now fulfils the proximity constraint with its previous phrase keyword B at position 4, i.e., AABBxCA As all of the phrase keywords occur in the text in the correct order and the proximity between keywords is matched, the process finds a phrase match at position 2 in the text.

The process may then repeat to determine whether there are additional matching phrases in the text. Thus, the next occurrence of the first phrase keyword A at position 7, (A,7) is unconditionally taken, i.e., AABBxCA

However, since there are no other occurrences of the next phrase keyword B, there can be no other matching phrases and the process ends.

Unlike the preparation of the iterators to identify keywords in the document as described in connection with the first embodiment of the invention for unordered phrases, for the second embodiment, a different iterator is preferably constructed for each phrase word, even if one or more phrase words appear multiple times in the phrase. For example, with the phrase A B A, the first phrase keyword A is preferably assigned its own hit iterator, and the third phrase word A is assigned another hit iterator, which will iterate through the same occurrences of the keyword, but the iteration cursor of a current position will be different. As indicated above, if a keyword has an empty hit list, the phrase does not match and the process ends.

In order to deal correctly with multiple occurrences of the same keyword in a phrase, the process preferably associates with each phrase keyword a list of the same keywords in the phrase. This list is referred to in the following as "samePhraseWordList". Thus, for example, if the phrase is "salsa dance", each phrase word occurs only one time in the phrase. There are no identical words. Accordingly, the samePhraseWordList is empty for each phrase word "salsa" and "dance". However, if the phrase is "to be or not to be", the samePhraseWordList associated with the first phrase word "to" is [5], the index in the phrase of the other occurrence of "to". Similarly, the samePhraseWordList associated with the second phrase word "be" is [6], with the third phrase word "or" is empty [ ], with the fourth phrase word "not" is empty [ ], with the fifth phrase word "to" is [1], and with the sixth phrase word "be" is [2].

The second embodiment of the process described in connection with FIGS. 8A-B and 9 may also be illustrated in the pseudo code which appears below, where the following definitions apply:

Iterator over a HitList (also called hit iterator): An iterator process that provides each hit of the HitList once and only once, moving to the next hit after each access.

samePhraseWordList: List of identical words in the phrase. A samePhraseWordList is associated with each phrase word and used to deal correctly with multiple occurrences of the same word in the phrase, as described below.

phraseWordIndex: The index (position) in the phrase of the current phrase word. The first phrase word is at index 1.

validHits: An array of valid match positions validHits[phraseWordIndex]=position, where position is the valid match position of the phrase word at index phraseWordIndex.

backtrackHits: An array of invalid match positions, used when backtracking. backtrackHits[phraseWordIndex]=position, where position is the invalid match position of the phrase word at index phraseWordIndex.

The pseudo code describing a preferred process for matching phrase occurrences is as follows:

```
Fill validHits[ ] with 0
Fill backtrackHits[ ] with -1
Loop
    phraseWordIndex = 1
    Do
        If (phraseWordIndex = 1)
            // Unconditionally take the next occurrence of the
first phrase word.
            hit = nextPhraseWordHit(phraseWordIndex)
                If (hit = -1)
                    Stop here
                End if
            validHits[phraseWordIndex] = hit
            phraseWordIndex = phraseWordIndex +1
        Else
            previousWordHit = validHits[phraseWordIndex -1]
            hit = backtrackHits[phraseWordIndex]
            distanceToPreviousWord = hit - previousWordHit
            // Skip all instances of the word occurring earlier than or at
            previousWordHit
            // (they could occur at the same index if same word appears multiple times
in phrase)
            While (distanceToPreviousWord <= 0)
                hit = nextPhraseWordHit (phraseWordIndex)
                If (hit = -1)
                    Stop here
                End if
                distanceToPreviousWord = hit - previousWordHit
            End while
            If (distanceToPreviousWord <= proximity)
                // Valid match for the word. Save it and go to the next
                phrase word
                back trackHits[phraseWordIndex] = 0
                validHits[phraseWordIndex] = hit
                phraseWordIndex = phraseWordIndex + 1
            Else
                // Invalid match for the word.
                // Backtrack to the previous phrase word to try to get a valid
                phrase match
                backtrackHits[phraseWordIndex] = hit
                phraseWordIndex = phraseWordIndex - 1
            End if
        End if
    While phraseWordIndex <= nb words in the phrase
    // At this point all the phrase words have been matched and they fulfil
    the proximity constraint
    There is a phrase match at the position of the first
phrase word: validHits[1]
End loop
```

The pseudo code describing a preferred process for obtaining the phraseWordIndex is as follows:

```
If there is no more next occurrence of phraseWordIndex in
its hit iterator
    Return -1
End if
If the list of identical words (samePhraseWordList) of
phraseWordIndex is empty
    // Easy case: the word appears only one time in the phrase.
    // So just take the next occurrence of the word.
    Take the next occurrence of phraseWordIndex in its hit
iterator
    Return it the next occurrence position
End if
// Difficult case: the word appears multiple times in the phrase.
// Take the next occurrence of the word that is not already taken by
another identical word of the phrase.
Loop
    hit = Take the next occurrence of phraseWordIndex in its hit
iterator
    sameHitFound = false
    For each samePhraseWordIndex in samePhraseWordList
        If hit = validHits[samePhraseWordIndex]
            sameHitFound = true
        End if
    End for
    If not sameHitFound
        Return hit
    End if
    If there is no more next occurrence of phraseWordIndex in
    its hit iterator
        Return -1
    End if
End loop
```

When there are n positions, i.e., words in text, and k phrase words with n≧k, and if the positions of the phrase words are in sorted order, then the process of the second embodiment for matching ordered phrases runs in O(n). In fact, there are a maximum of n loops in which the next occurrence of all k phrase words are analyzed. Comparing the speed of the two processes, one for unordered phrases and one for ordered phrases, the process for ordered phrases is asymptotically faster than the unordered process. The processes of the invention as described are quite efficient and fast in comparison with other known phrase matching processes.

While the foregoing has been with reference to preferred embodiments of the invention, it will be appreciated that changes in these embodiments may be made without departing from the principals and the spirit of the invention, the scope of which is defined in the appended claims.

The invention claimed is:

1. A process for matching predefined phrases in content using a computer system, a phrase comprising a plurality of keywords, comprising the steps performed by the computer system of:
   constructing a hit list for each of said keywords of a predefined phrase, each hit list indicating for each keyword the positions of occurrences of each keyword in the content;
   forming, from said hit list, a sorted set of all of the keywords of the phrase, the sorted set comprising for each keyword one position of occurrence of such keyword in a group of consecutive words in the content;
   comparing a distance between keywords in said sorted set to a predetermined proximity constraint; and
   indicating a phrase match if all of said keywords are present and said distance is less than or equal to said proximity constraint,
   wherein forming said sorted set comprises forming an unordered sorted set of all keywords without regard to the order of occurrences of the keywords in the phrase, and wherein comparing the distance between keyword positions comprises comparing the distance between keywords having the highest position and the lowest position in said sorted set, and wherein said proximity constraint comprises a parameter MaxSpan=p(k−1), where p comprises a proximity and k comprises the number of keywords in the phrase.

2. The process of claim 1, further comprising indicating no match for the phrase in the content if any keyword hit list is empty.

3. The process of claim 1 further comprising, upon said distance between keywords in said sorted set not satisfying said proximity constraint, removing from said sorted set the keyword having the lowest position, forming a new sorted set starting with a next lowest position keyword, and repeating said comparing and indicating for said new sorted set.

4. The process of claim 3 further comprising, upon said distance between keywords in said new sorted set not satisfying said proximity constraint, repeating said removing, forming and comparing steps for another new sorted set.

5. The process of claim 1 further comprising forming another sorted set of keywords for another occurrence of the phrase, wherein the keywords of the other sorted set do not overlap the keywords of said first-mentioned sorted set, repeating said comparing and indicating steps for said other sorted set, and classifying said content upon a predetermined number of said phrases matching.

6. The process of claim 1, wherein forming said sorted set further comprises forming an ordered sorted set all keywords of the phrase in the order of occurrences of said keywords in said phrase.

7. The process of claim 6, wherein said comparing the distance between keyword positions to the proximity constraint further comprises comparing the distances between all consecutive keywords in said ordered sorted set.

8. The process of claim 7 further comprising indicating a match if said distances between all consecutive keywords in said ordered sorted set are less than or equal to said proximity constraint.

9. The process of claim 7 further comprising, upon said distance between a pair of consecutive first and second keywords being greater than said proximity constraint, removing the first keyword of the pair, backtracking to a next occurrence of the first keyword of the pair in said content and forming a new ordered sorted set beginning with said next occurrence, and comparing the distances between the first and second keywords of the new ordered sorted set to said proximity constraint.

10. The process of claim 9 further comprising, upon said proximity constraint not being satisfied for said first and second phrase keywords in the new ordered sorted set, repeating said removing, backtracking, forming, and comparing for another new ordered sorted set.

11. The process of claim 1 further comprising, upon indicating a phrase match, repeating said forming, comparing and indicating on a new sorted set that does not contain any occurrences of phrase words of said first-mentioned sorted set.

12. The method of claim 1 further comprising classifying said content into one or more predefined taxonomy categories based upon matching a number of occurrences of keywords or phrases in said content with corresponding keywords or phrases each taxonomy category.

13. Computer readable non-transitory media embodying instructions for controlling the operation of a computer for matching predefined phrases in content, a phrase comprising a plurality of keywords, comprising:
constructing a hit list for each of said keywords of a predefined phrase, each hit list indicating for each keyword the positions of occurrences of each keyword in the content;
forming, from said hit list, a sorted set of all of the keywords of the phrase, the sorted set comprising for each keyword one position of occurrence of such keyword in a group of consecutive words in the content;
comparing a distance between keywords in said sorted set to a predetermined proximity constraint; and
indicating a phrase match if all of said keywords are present and said distance is less than or equal to said proximity constraint, wherein said forming comprises forming an unordered sorted set of keywords without regard to the order of occurrence of the keywords in the phrase, and said comparing comprises comparing the distance between keywords having the highest position and the lowest position in said sorted set to a parameter MaxSpan=p(k−1), where p comprises a proximity and k comprises the number of keywords in the phrase.

14. Computer readable media of claim 13, wherein said forming further comprises forming an ordered sorted set of keywords in phrase order, and said comparing further comprises comparing the distances between consecutive keywords in the ordered sorted set to said proximity constraint, and said indicating further comprises indicating a phrase match if all consecutive keywords of the ordered sorted set are less than or equal to said proximity constraint.

15. Computer readable media of claim 13 further comprising forming another sorted set of keywords of the phrase, wherein the other sorted set of keywords does not overlap said first-mentioned sorted set, repeating said comparing and said indicating for said other sorted set, and said indicating comprises indicating a match between said content and one or more predefined categories of a taxonomy based upon matching phrases in said content.

16. Computer readable media of claim 13 further comprising instructions for classifying said content into one or more predefined taxonomy categories based upon matching a number of occurrences of keywords or phrases in said content with corresponding keywords or phrases each taxonomy category.

17. A computer system for matching predefined phrases in content, a phrase comprising a plurality of keywords, comprising:
a processor receiving said content and a set of rules defining keyword ordering and a proximity constraint for a predefined phrase; and
computer readable media embodying instructions for controlling the operation of said processor to perform a method of processing said content to:
construct a hit list indicating the positions of occurrences in said content of each keyword of said predefined phrase;
form from said hit list an unordered sorted set of keywords comprising one occurrence of all keywords of the predefined phrase without regard to the order of occurrence of the keywords in the phrase;
compare a distance between occurrences of keywords having the highest position and the lowest position in said sorted set to a parameter MaxScan=p(k−1), where p comprises a proximity and k comprises the number of keywords in the phrase; and
indicate a phrase match if all of said keywords are present and said distance is less than or equal to said proximity constraint.

18. The computer system of claim 17, wherein upon the distance between occurrences of keywords in the sorted set not being less than or equal to said proximity constraint, the computer system removes the keyword in the lowest position from the sorted set, forms a new sorted set beginning with the keyword at the next lowest position in the sorted set, and compares the distances between keywords in said new sorted set with said proximity constraint.

19. The computer system of claim 17, wherein said instructions further comprise instructions to form an ordered sorted set of keywords in phrase order, instructions to compare the distances between consecutive keywords in the ordered sorted set to said proximity constraint, and instructions to a phrase match if all consecutive keywords of the ordered sorted set are less than or equal to said proximity constraint.

* * * * *